May 22, 1956 P. H. DU BOIS 2,746,681

TRANSLATING APPARATUS

Filed Nov. 17, 1954 2 Sheets-Sheet 1

Philip H. Du Bois,
Inventor.
Koenig and Pope,
Attorneys.

May 22, 1956 P. H. DU BOIS 2,746,681

TRANSLATING APPARATUS

Filed Nov. 17, 1954 2 Sheets-Sheet 2

Philip H. Du Bois,
Inventor.
Koenig and Pope,
Attorneys.

United States Patent Office 2,746,681

Patented May 22, 1956

2,746,681

TRANSLATING APPARATUS

Philip H. Du Bois, Clayton, Mo.

Application November 17, 1954, Serial No. 469,521

14 Claims. (Cl. 235—61.6)

This invention relates to translating apparatus for decoding numerical information and, more particularly, to such apparatus associated with record-controlled machines employing record cards of the Hollerith type.

Briefly, the present invention is directed toward apparatus for translating two decimal digits, represented as to numerical value by one or two differentially timed impulses occurring in ten possible sequential digit-indicating instants of time during a single operational cycle of at least eleven possible sequential instants of time and represented as to denominational order by the presence or absence of an additional electrical impulse at a nondigit-indicating instant of time during said single operational cycle, into two separate differentially timed impulses, one in each of first and second separate electrical output circuits of assigned denominational order. This apparatus includes a first electrical input connected to a conditioning circuit and adapted to receive impulses during a first machine cycle, and a second electrical input connected to a third electrical circuit and adapted to receive impulses during a following machine cycle. The third circuit is adapted to connect the second input commonly to said first and second output circuits to transmit a single digit-indicating impulse simultaneously thereto. The third circuit also includes means responsive to reception of a second impulse by the conditioning circuit to modify the connections between said second input and said first and second output circuits whereby the first of two differentially timed digit-indicating impulses is transmitted from said second input to only one of said output circuits and the second of such impulses is transmitted to only the other of said output circuits.

Among the several objects of this invention may be noted the provision of translating apparatus that permits utilization of a Hollerith type record card in which double the amount of numerical data has been encoded (as compared with the capacity of the card coded in the usual Hollerith coding) with no change in the format of the blank card or in the coding of each decimal digit as a function of spatial position within a column; the provision of such apparatus which operates to translate numerical information encoded in a new code (in which two decimal digits are coded as one or more indications or impulses in a group of eleven index point positions in a single record card column or in a single operating cycle of eleven sequential instants of time and in which the denominational identity of the two digits being translated is preserved while still retaining the within-column spacing of conventional Hollerith coding) into conventional Hollerith differential timing code; the provision of apparatus of the class described which may be associated with conventional record-controlled machines so that they can utilize numerical data encoded in accordance with the new coding system described herein and yet be readily convertible to functions employing numerical data encoded in conventional Hollerith type coding or other codes for which the machine is adapted; the provision of apparatus by which two decimal digits coded as one or more indications in eleven index point positions, ten of which may have the same meaning and which may be in exactly the same relative positions within the column of the card or other record as in conventional Hollerith coding, can be used to originate differentially timed impulses in two mutually independent circuits, thus conveying in the Hollerith differential timing code the original decimal information, with the denominational relationship of the two digits preserved; the provision of translating apparatus which permits statistical, computing and accounting machines which are normally responsive to differential time coding to be controlled, without other major change, by records with data representations in the new code; the provision of apparatus by which a series of records in the new code can be used in connection with appropriate existing machines to develop a new series of records coded in the conventional Hollerith system for use in statistical machines, accounting machines and the like, adapted to handle information in the Hollerith code; the provision of such translating apparatus which is fully compatible with most record-controlled machines employing Hollerith-type record cards and conventional Hollerith coding; and the provision of apparatus which greatly reduces the time required for sorting, collating and reproducing during a series of operations with records, and further yields substantial savings by a significant reduction in the cost of record forms and in the space and facilities required for their storage. Other objects will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 illustrates a portion of a conventional Hollerith type record card perforated in six columns in accordance with the conventional Hollerith system to indicate six decimal digits of numerical information;

Corresponding reference characters indicate corresponding parts throughout the several views of the drawings.

Figure 1:
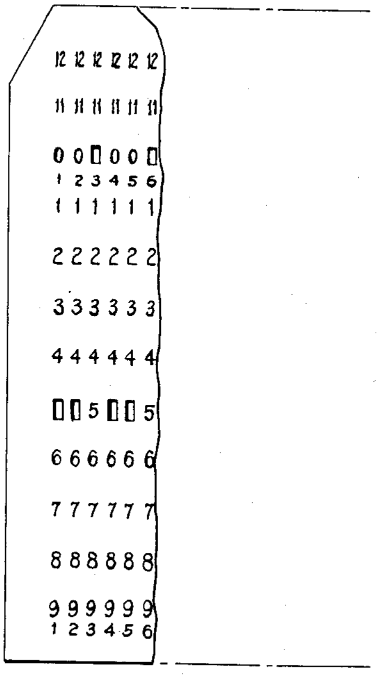

In the prior art no numerical coding system for use in record-controlled machines has been available having all five of the following characteristics: (1) a single mode of indication, such as perforations of uniform size and shape formed at index point positions; (2) applicability to groups of conventional equally-spaced index point positions, such as those in the columns of tabulating cards in common use; (3) positive indication of zeros; (4) representation of decimal digits solely by virtue of the differential location of the data indications; and (5) representation of a two decimal digit number uniquely in a group of not more than eleven index point positions.

Hollerith numeric coding, and none other hitherto described, has all of the first four characteristics, each of which has definite and substantial advantages for use in a system of record-controlled machines. Various combination codes have characteristics (1), (2) and (5), and some have characteristic (3). Only the novel coding system, referred to hereinafter as bidecimal coding, described herein and in my copending application Serial No. 451,329, filed August 23, 1954, has all five of the characteristics listed above. Through the use of the present invention bidecimal coding can be utilized in the control of various devices, such as accumulators, printing and sorting mechanisms, and multiplying and dividing means, commonly found in record-controlled machines.

In accordance with the present invention, translating apparatus has been developed which decodes numerical information encoded in a bidecimal code and which, when used in association with the appropriate record-controlled machines, operates to supply differentially timed impulses conventionally generated through the use of records encoded in Hollerith numerical coding.

In view of the fact that the present inveniton relates to translating apparatus which automatically decodes numerical information coded in the novel bidecimal coding system into numerical information coded in the conventional Hollerith type code, the two coding systems will be compared. In Hollerith coding, an indication in any single operational cycle, such as a perforation, in one of ten index point positions of a column of a record card, yields digital meaning through a time differential in some type of sensing, such as the completion of an electrical circuit through the perforation giving rise to a differentially timed impulse. This differentially timed electrical impulse can be used during any one machine cycle to start or stop the rotation of a counter wheel or to cause the operation of a perforating device as by operating a magnet, or to control in other ways the functions of an accounting or statistical machine, or other record-controlled machine. Bidecimal coding, which can be translated by the instant apparatus into the Hollerith differential timing code, utilizes the ten index point positions of conventional Hollerith coding for encoding two decimal digits. Since each of the ten decimal digits from 0 to 9 inclusive is assigned to one of the ten index point positions, two alternatives are apparent: (1) two digital index point positions will be utilized, showing that the two encoded digits are numerically different; or (2) only one digital index point will be utilized, showing that the two encoded digits are numerically the same.

In the case where the two encoded digits are numerically different, it is necessary that they be identified as to their relative denominational order. Mathematically speaking, only one "degree of freedom" is involved, since if the relative denominational order of one of the digits is positively identified, the relative denominational order of the other immediately becomes known without further identification.

The one characteristic that distinguishes two digits encoded as two indications among ten index point positions is that one digit is numerically greater than the other. Accordingly, in bidecimal code an eleventh index point position, designated as E-position (and which when positively indicated gives rise to an impulse during a single operational cycle at the instant designated as E-time) is used to indicate either: (1) that the numerically greater digit has a higher denominational order than the lesser digit; or (2) that the numerically greater digit has a lower denominational order than the lesser digit. Neither method has any special advantage over the other, but for purposes of illustrating this disclosure, it will be assumed that an indication in the E-position has been assigned the meaning that the numerically greater digit has a lower denominational order than the lesser digit. It will be understood, of course, that the terms "higher" and "lower" as applied to the denominational orders of represented digits are arbitrary terms of convenience, since the digits may or may not be parts of the same number. As a matter of further convenience, the digit of "higher" denominational order will be arbitrarily called the "tens-digit," and the other digit encoded in the same group of index point positions the "units-digit."

In conventional written and printed decimal notation, as is well known, the denominational orders of the digits constituting a multi-digit number are indicated by the positions of the digits, with the higher denominational orders having positions to the left and the lower orders having positions to the right. For example, in the 3-digit number 354, it is understood that the "3" means 300, the "5" means 50 and that "4" means 4.

Conventional Hollerith coding also utilizes position to indicate denominational order, in that each digit is encoded in a separate column of index points on a record, and each column carrying such coding gives rise to an impulse in a separate circuit, but only in accumulators and in printing results is there a fixed requirement that the digit with the higher denominational order appear to the left of the digit of lower denominational order.

As indicated above, for numerical information amounting to two decimal digits, i.e., any number from 00 to 99, inclusive, bidecimal coding utilizes the presence or absence of an indication at the E-position, or of an impulse at E-time in a single operational cycle, to indicate the relative denominational order of the two digits, with position used for indicating the relative denominational orders of bidecimal combinations of digits.

Essentially it is to the uniqueness of a single indication among the ten digital index point positions to which it is possible to assign the meaning that the "tens-digit" and the "units-digit" are equal. Accordingly, a single indication in a digital position is taken as indication of two equal digits. Bidecimal coding is, however, changed in no essential characteristic if an indication in the E-position also accompanies the case in which the tens-digit and units-digit are equal, and the changes in the devices used for decoding will be readily apparent to one skilled in the art.

For the utilization of bidecimal coding, the record and the machines controlled by the record may be designed so that the extra position is read either before or after the numerical index point positions in each operational cycle. Similarly, the order of reading the digital positions may be either from high to low or from low to high. In the exemplary variation of bidecimal coding used illustratively in this disclosure, the order of reading the digital positions will be from high to low, that is, 9,8,7,6,5,4,3,2,1 and 0, and in any given machine cycle the digital positions will be read before the E-position. Arbitrarily, of the two nondigital positions in the column of the conventional Hollerith card, the 11- or X-position will be used as the E-position. The 12- or Y- or R-position could, of course, be used with only very minor modifications of the disclosed arrangements, modifications which would be immediately apparent to one skilled in the art.

For the purposes of this disclosure, the variation of bidecimal coding given below is used illustratively. In this specific instance, E refers to a perforation in the 11- or X-position of a Hollerith card, or a corresponding impulse at 11-time during the machine or card cycle, while the digits, from 0 to 9 under the heading "Bidecimal," refer to differentially spaced perforations in the card or differentially timed impulses at appropriate times in the cycle. It is to be noted that the denominational order of the digits under "Decimal" depends upon the relative position of the two digits, but that each combination of bidecimal indications is a unique representation of the corresponding two-digit number irrespective of the sequence in which the indications are shown. In bidecimal coding, the presence or absence of an indication at the E-position or of an E-impulse replaces sequence in each combination of two unlike digits as the indicator of relative denominational order.

Also, in the preferred embodiment of the present invention, the bidecimal coding variation described above is particularly advantageous in that present types of record cards can be used without change, that the meanings of the codings are readily apparent and that each column has an unused index point position to which functions other than the indication of numerical information can be assigned. It will be clearly understood, however, that the principle of the invention can be used equally well with other variations of bidecimal coding.

The complete coding system for this preferred variation of bidecimal coding for all combinations of two digits from 00 to 99 follows:

| Decimal | Bidecimal | Decimal | Bidecimal |
|---|---|---|---|
| 00 | 0 | 50 | 05 |
| 01 | 01E | 51 | 15 |
| 02 | 02E | 52 | 25 |
| 03 | 03E | 53 | 35 |
| 04 | 04E | 54 | 45 |
| 05 | 05E | 55 | 5 |
| 06 | 06E | 56 | 56E |
| 07 | 07E | 57 | 57E |
| 08 | 08E | 58 | 58E |
| 09 | 09E | 59 | 59E |
| 10 | 01 | 60 | 06 |
| 11 | 1 | 61 | 16 |
| 12 | 12E | 62 | 26 |
| 13 | 13E | 63 | 36 |
| 14 | 14E | 64 | 46 |
| 15 | 15E | 65 | 56 |
| 16 | 16E | 66 | 6 |
| 17 | 17E | 67 | 67E |
| 18 | 18E | 68 | 68E |
| 19 | 19E | 69 | 69E |
| 20 | 02 | 70 | 07 |
| 21 | 12 | 71 | 17 |
| 22 | 2 | 72 | 27 |
| 23 | 23E | 73 | 37 |
| 24 | 24E | 74 | 47 |
| 25 | 25E | 75 | 57 |
| 26 | 26E | 76 | 67 |
| 27 | 27E | 77 | 7 |
| 28 | 28E | 78 | 78E |
| 29 | 29E | 79 | 79E |
| 30 | 03 | 80 | 08 |
| 31 | 13 | 81 | 18 |
| 32 | 23 | 82 | 28 |
| 33 | 3 | 83 | 38 |
| 34 | 34E | 84 | 48 |
| 35 | 35E | 85 | 58 |
| 36 | 36E | 86 | 68 |
| 37 | 37E | 87 | 78 |
| 38 | 38E | 88 | 8 |
| 39 | 39E | 89 | 89E |
| 40 | 04 | 90 | 09 |
| 41 | 14 | 91 | 19 |
| 42 | 24 | 92 | 29 |
| 43 | 34 | 93 | 39 |
| 44 | 4 | 94 | 49 |
| 45 | 45E | 95 | 59 |
| 46 | 46E | 96 | 69 |
| 47 | 47E | 97 | 79 |
| 48 | 48E | 98 | 89 |
| 49 | 49E | 99 | 9 |

It will be readily apparent from the above description that bidecimal coding as employed in conjunction with the present invention is not to be confused with binary coding or with the numerous combinational codes which are sometimes used to increase the data-holding capacity of records used in controlling statistical, computing and accounting machines.

In the present instance, also, the invention will be illustrated with special reference to perforated records of the type used in the Hollerith system of recording accounting and statistical data. However, it will be readily understood that the present invention is not restricted to use with perforated record cards, sheets or tapes. Like Hollerith coding, bidecimal coding can be used on record cards with indications other than perforations, such as indications in the form of electrically conductive pencil marks, or as magnetized indications on magnetic drums or tapes, or, broadly speaking, whenever the differential spacing of indications in the record is directly correlated with the differential timing of electrical impulses in circuits in the machine.

Figure 2:
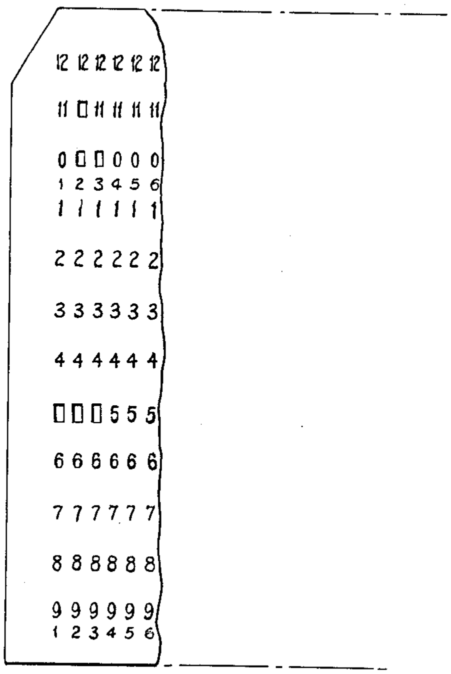
Fig. 2 illustrates a portion of a conventional Hollerith type record card as perforated in three columns in accordance with the new code described herein to indicate a corresponding six decimal digits of numerical information.

Referring now to Fig. 1, there is shown a portion of a conventional tabulating card of the Hollerith type in which the multiple digit number 550,550 is indicated in conventional Hollerith coding by a single perforation in each of the first six columns, each digit therefore being represented at an index point position in a separate column. In Fig. 2 the identical multiple digit number 550,550 is indicated in a preferred variation of bidecimal coding by perforations in only three columns, two digits being indicated in each column. In the first of these three columns of the Fig. 2 record card there is a single perforation with a digital value of 5, which in this variation of bidecimal coding carries the value of 55. In the next column there are three perforations, two digital perforations with values of 0 and 5, together with a perforation in the assigned E-position, which in this example is the X- or 11-position. Since E is positively indicated, the "units-digit" of this combination is greater than the "tens-digit," and hence the value of 05 is indicated. In the third column there are two digital perforations, with values of 0 and 5, unaccompanied by an E-perforation. Accordingly, the "tens-digit" is greater than the "units-digit" in this column and a value of 50 is indicated.

Bidecimal coding provides, therefore, for the preservation of denominational information for the combination of two digits within each column, but from column to column denominational relationships are indicated, generally speaking, in the conventional fashion, that is, within the same number, parts of the number to the left have higher denominational orders than parts of the number to the right. Accordingly, the complete multiple digit number indicated in the three columns is 550,550, exactly the same as indicated in the six columns in Fig. 1.

The invention disclosed herein will be described with reference to an electric means of sensing the indications in the records and translating such indications directly into electrical impulses which are utilized to control the functions of the machine, and for this purpose the invention is disclosed as utilizing information from electrical sensing brushes. It is clear, however, that the brushes may be replaced by photocells or similar devices which do not necessarily have any direct contact with the record for the purpose of analyzing the data, or by a frictional sensing device. Furthermore, the invention is disclosed partly in terms of "relays," "magnets" and "rectifiers." It is to be understood that, as used in this disclosure and the subsequent claims, the term "relay" refers to any type of mechanical or electrical switch, electronic tube, transistor, selector or distributor, by which the flow of an electric current (called the "output signal") is changed from one route to another, or is interrupted, or is given a route, in response to the action of another electric current (called the "control signal"), while the term "magnet" or "coil" refers to any part of a "relay" which is directly actuated by the "control signal." The term "rectifier" as used herein refers to any device, such as a selenium or copper oxide rectifier or vacuum tube, which, when used in a circuit, permits the passage of current in one direction only. Also, delay in relay action has been secured through the use of a prior acting relay. Other methods of securing delay in a relay are well-known in the art and may sometimes be preferred for practical reasons of economy.

Holding circuits used for holding a relay closed for a period of time subseqeunt to the activation of the relay by a control signal are disclosed as permitting the passage of current through the same winding as is used for initial actuation. It may be convenient, however, to employ doubly wound magnets, using one coil for the actuating circuit and the other for the holding circuit. Such arrangements are well-known in the art, when magnet-type relays are used.

The instant invention will be disclosed in connection with a tabulating machine, although any one of a large number of different types of record-controlled machines, such as sorting machines, interpreting machines, computing or calculating machines, multiplying and dividing machines, collating machines, statistical machines, reading machines, data processing machines and accounting machines, would have served equally well. The specific device used for illustration is that disclosed in U. S.

Patent 1,976,617. For the purposes of this disclosure, except as specifically indicated, all tabulating machine operations shall be considered substantially identical to those described in the cited patent. These operations include, for example, movement and sensing of cards, action of accumulator mechanisms, printing of totals, and the origination of impulses that, transmitted by a suitable means to a suitable perforating or magnetizing device, can be used in the origination of cards or other records conveying in the Hollerith numerical code information standing in the accumulators at any total cycle.

Since the organization of parts and the operation of this machine are fully set forth in the above-cited patent, its action will be described herein only to the extent necessary to facilitate the understanding of one embodiment of the present invention. For a complete explanation of the functions of one type of a tabulating machine, reference may be had to the patent cited above, so that the explanation herein may be confined to a description of the invention and an explanation as to the manner in which it may be applied to such a machine. In doing so, reference characters or parts corresponding to similar parts shown in the patent will be more or less the same as in the patent, and the mechanisms relating to the invention and improvements will begin at 500.

As described in the patent cited above, the tabulating machine to which one embodiment of the present invention will be applied comprises, generally, a card feeding and analyzing section which feeds perforated record cards to the analyzing devices where they are sensed by the analyzing mechanism. An accumulating mechanism is located in the center of the machine and comprises five accumulators. A printing mechanism at one side comprises seven so-called banks of printing type bars. Below the accumulators is the plugboard of the machine, by means of which the various units may be coordinated to produce a desired result in the form of a printed record. A tabulating motor serves to drive the card feeding devices, the accumulators, and the printing mechanism through suitable controlling mechanisms. Devices and means of controlling tabulating mechanisms of this class are well-known in the art and are described in full detail in the patent, to which explicit reference is made.

Figure 3:
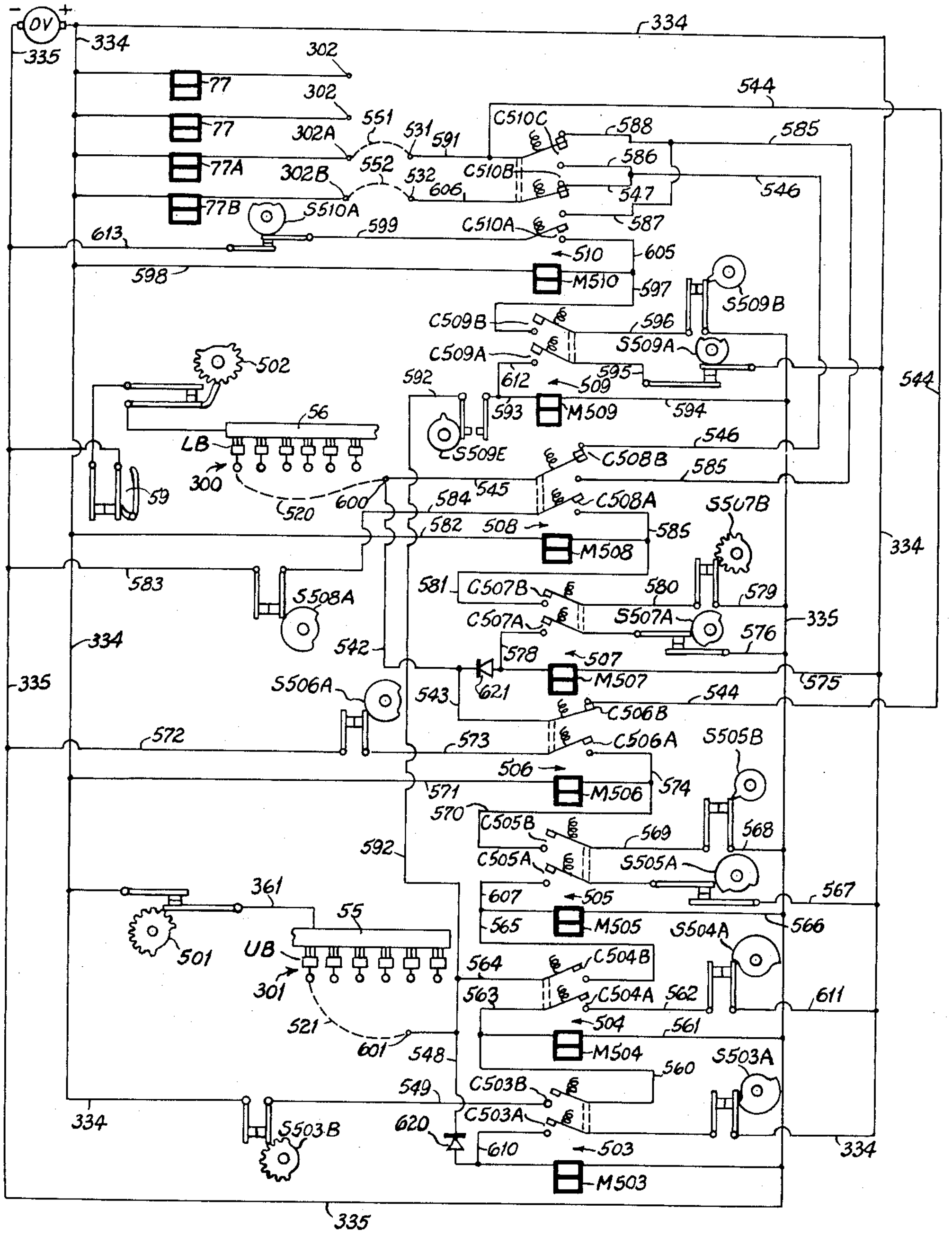
Fig. 3 is a circuit diagram of exemplary translating apparatus of the present invention; and, Fig. 4 is a chart illustrating the timing of circuit making and breaking devices employed in the apparatus of Fig. 3.

Referring now to Fig. 3, two sets of reading brushes UB and LB are shown schematically, together with the circuits of an exemplary embodiment of the invention. Circuit-breaking devices, which, along with the record cards, control the making and breaking of the current in the several circuits, are also shown schematically in Fig. 3. Each record card passes the upper brushes UB during a first machine cycle and then, during the following machine cycle, passes the lower brushes LB. Since the cards are fed with the 9-edge leading, the order of reading the twelve index point positions, at both sets of reading brushes, is 9, 8, 7, 6, 5, 4, 3, 2, 1, 0, 11 (herein denoted as the E-position) and 12 (herein unused).

Figure 4:
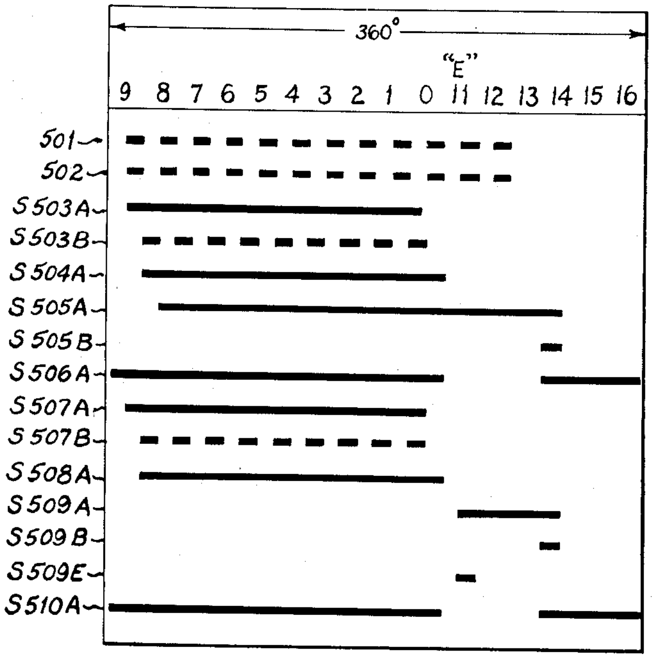

Referring now to Fig. 4, the operating sequences of the several circuit-breaking devices of Fig. 3 are shown. In the present embodiment of the invention, these devices are cam-operated switches keyed to shaft 60 (see Fig. 3 of U. S. Patent 1,976,617 cited above). A complete revolution of shaft 60 constitutes a single operational cycle during which one data card may be under the lower brushes LB and a following card may be under the upper brushes UB. Each operational cycle is divided into sixteen equal divisions of time. Each card is actually under the reading brushes only for the twelve divisions of a single operational cycle such as that designated as 9, 8, 7, 6, 5, 4, 3, 2, 1, 0, 11 and 12, these numbers corresponding to the conventional index point positions and intervening spaces of the tabulating card. The portion of the operational cycle that a card is under a brush is referred to as a machine or card cycle. It is to be noted that approximately half of each of these twelve divisions corresponds to the time the perforation is read and half to the time between perforations or at an edge of the card. It is also to be noted that divisions of time designated as 13, 14, 15 and 16 correspond to no index point positions on the card but rather are divisions of the operational cycle when no card is at a reading station.

It will be noted that an impulse encoding a numerically greater decimal digit (e. g., 5) occurs in a card or operational cycle before an impulse encoding or representing a digit of lesser numerical value (e. g., 0).

In the circuit diagram in Fig. 3, relay magnets and their associated contacts have generally been shown in close proximity to one another and the relay contacts have been designated with the same reference number as their controlling magnets, the contacts having a prefix "C" and a capital letter suffix while the relay coils or magnets are prefixed with a capital "M." The cam-operated switches generally carry a prefix of a capital "S."

As shown in Fig. 3, adding magnets 77 are wired directly from plug sockets 302. The purpose of the circuits shown in Fig. 3 is to control a pair of adding magnets 77 by indications in a single column of a record encoded in bidecimal code in exactly the same way as they would be controlled by two columns of conventional Hollerith coding.

In general there are two major circuit systems involved. The first is a conditioning circuit connected via a first input, socket 601, to a sensing means, upper brushes UB. The second major circuit system is an action circuit which connects a second input, socket 600, to a second sensing means, lower brushes LB. The action circuit is adapted to interconnect the second input, along pathways yet to be described to first and second separate electrical output circuits of assigned denominational order. One such output circuit, comprising a wire 606 and an output socket 532, receives the impulse representing the tens-digit. The second such output circuit, comprising a wire 591 and output socket 531, receives the impulse representing the units digit. For brevity these output sockets 532 and 531 may be designated hereinafter as the "tens output" and "units output," respectively. Socket 532 is connected by a jumper or patch cord 552 to socket 302B which is connected to a magnet 77B, while socket 531 is similarly connected by jumper or patch cord 551 to plug socket 302A, which in turn is connected to a magnet 77A. To a limited extent, as will appear hereinafter, the action circuit from lower brushes LB also performs conditioning functions.

It will be noted that components in Figs. 3 and 4 herein correspond to those in Figs. 29, **29*a* and 29*b* in the above-cited patent where corresponding reference characters are utilized. However, as noted above, reference characters above 500** designate additional components and circuits which have been associated with the Fig. 29 circuit components and form an exemplary translating apparatus of the present invention.

Power is supplied to the circuits and components of Fig. 3 via lines 334 and 335 from any convenient electrical D. C. power source DV. The rotation of an impulse distributor wheel 501 (corresponding generally to wheel L11 of the patent cited) keyed to shaft 60 (not shown herein) causes its associated contacts to be opened and closed in the pattern or sequence indicated in the first row of Fig. 4 by reference character 501. The intermittent closure of the contacts provides, in effect (by making possible the completion of an electrical circuit), a series of electrical impulses of equal duration spaced apart in short equal time increments or intervals (e. g., $\frac{1}{40}$ of a second) and differentially timed in relation to an arbitrarily preselected instant of time, such as the moment of time when the record card is initially positioned at the upper brushes UB. Thus a series of differentially timed impulses, in a single operational cycle of at least 11 (12 in the specific instance) possible sequential instants of time, are available via wire 361 and contact roller 55. Similarly, circuits through the lower brushes LB can be completed only at such times in a machine cycle as the contacts associated with an impulse distributor wheel 502 (corresponding generally to 61 in the patent cited) are closed. Times of their closure are indicated in the second line of Fig. 4 and correspond to those of the contacts associated with distributor wheel 501. Circuits through the lower brushes can be completed only when card lever contacts 59 are closed as explained in U. S. Patent 1,976,617. Thus, an electrical circuit through the upper brushes UB is completed and a differentially timed impulse is formed any time a perforation in a record card appears between the upper brushes UB and roller 55, providing, of course, that the advance of each card through the sensing station is in synchronism with the instants of closure of contact 501 (which should correspond to the instants of alignment of the perforations between any brush UB and roller 55). Similarly, electrical circuits can be completed through the lower brushes LB only at such times in the card cycle as a perforation in the record card appears between any brush LB and roller 56.

There are three general conditions under which this embodiment of the invention must function appropriately. First, if there is a single digital indication in the particular column of the record being analyzed, a circuit must be completed through the lower brushes both to the units output at socket 531 and to the tens output at socket 532. Second, if the encoded tens digit is numerically greater than the units digit, and accordingly there is no E-indication in the column, then when the first digital indication (i. e., the one of higher numerical value) is sensed at the lower brushes there must be a circuit completed through the lower brushes to only the tens output 532, and later in the card cycle when the second indication (i. e., the one of lower numerical value) is sensed, there must be a circuit from the lower brushes through to only the units output 531. Third, if the units digit is numerically greater than the tens digit, this condition being indicated by the presence of a positive indication in the E-position, there must be a circuit completed from the lower brushes to only the units output 531 when the first digital impulse is sensed and a similar connection must be completed from the lower brushes to only the tens circuit 606 at the time, later on in the cycle, when the second indication is sensed. In either of the two latter cases (where there are two unlike digits) as the circuit to a single output of assigned denominational order is completed, it will be noted that the connection to the other output is broken. The organization and operation of components and circuits of Fig. 3 whereby these functions are attained are set forth in detail hereinafter.

It will be assumed that the Fig. 2 record card is to be translated. For purposes of clarity and brevity the operation of the Fig. 3 apparatus will be described in each instance with regard to the indicia or numerical information contained in a single record card column. It will be understood, however, that the "scanning" or sensing of the indicia in other columns (79 more on the conventional Hollerith record card) proceeds concurrently, through similar apparatus and that the resulting translated data are applied to additional sets of magnet or relay coils 77. As the first column of the Fig. 2 record card contains only a single digital indication or perforation at "5" time, this is exemplary of the first condition described above, namely, where there is only a single digital indication (representing two like digits) in the record column to be analyzed and translated.

The Fig. 2 record card is first positioned in the apparatus of Fig. 3 so as to pass during a first machine or card cycle under upper brushes UB. As will be described hereinafter, where there is only a single digit indication in the column being sensed, the conditioning circuit, which is responsive to the impulses generated by brushes UB, does not effect any change in the circuit connections of the action circuit connecting lower brush LB to outputs 531 and 532. During the second or a following machine or card cycle, the record card passes under the lower brush LB. At "5" time, the single indication or perforation in column 1 becomes aligned between conductor 56 and brush LB thereby completing a common electrical circuit to both the tens and units outputs 532 and 531, respectively. The circuit to the units output socket 531 is from line 335 via lower card lever contacts 59, circuit breaker contacts 502, common conductor 56, perforation in the record card, brush LB, plug 300, patch cord 520, socket 600, line 542, line 543, normally closed contacts C506B and line 544 to line 591. This circuit is completed to tabulating magnet 77A and line 334 through socket 531, patch cord 551 and socket 302A. The circuit to the tens output socket 532 is exactly the same as described above as far as plug socket 600, from which it proceeds through line 545, normally closed contacts C508B, line 546, line 547 and normally closed contacts C510B and line 606. The circuit to tabulating magnet 77B and line 334 is completed through socket 532, patch cord 552 and socket 302B.

Thus, it is seen that a single indication or perforation in a record card column passing the lower brush is translated into a first impulse representing the indicated digit which appears in the tens output simultaneously with the appearance in the units output of a second impulse representing the indicated digit. In the example posed (reading column 1 of the Fig. 2 record card), the single indication or perforation at "5" is thus translated into two independent impulses in separate outputs which thereby indicate the two-digit number "55."

The components and circuits of the Fig. 3 apparatus will now be further described by consideration of the apparatus operation during the second general condition defined above; namely, where two unlike digits are encoded in a single record card column and the encoded tens digit is numerically greater than the encoded units digit. This is exemplified by column 3 of the Fig. 2 record card where the two-digit number "50" is encoded as perforations at "5" and "0." During the first machine cycle when the Fig. 2 card is under upper brush UB, the alignment and sensing of the "5" perforation by UB completes a circuit from line 334, through contacts 501, line 361, contact roller 55, the record card perforation, upper brush UB, socket 301, connection 521, socket 601, line 548, rectifier 620, relay coil M503, to line 335, thus energizing relay 503. A holding circuit including wire 610, contact C503A and cam-operated switch S503A maintains magnet coil M503 energized from the time the first or highest perforation is sensed until almost the completion of the digit-indicating portion of the first machine cycle. Since both sets of contacts C503A and C503B are closed after any digit-indicating impulse greater than 0 is originated at upper brush UB, there will be a circuit completed from line 334, through cam-operated switch S503B, line 549, contacts C503B, line 560, magnet M504, line 561, to line 335. However, due to the timing sequence of S503B, energization of coil M504 is delayed until just after a first impulse is received by socket 601. Actuation of relay 504 closes contacts C504A and C504B, the former completing a holding circuit for M504, said holding circuit including wire 563 and cam-operated switch S504A. This latter switch remains closed until just prior to the beginning of "E" time in the first machine cycle. Thus, contacts C504B are closed immediately after the sensing of a first digit-indicating impulse by the upper brush UB and remain closed for any second digit-indicating impulse 8 through 0 inclusive.

It will be seen, therefore, that if there is a second digit-indicating perforation in column 3 of the Fig. 2 record card a circuit will be completed via socket 601, wire 564, contacts C504B, wire 565, magnet M505, wire 566 to line 335, thus actuating relay 505. A holding circuit for relay 505 from line 334 to line 335 is constituted by line 567, switch S505A, relay contacts C505A, line 607, magnet M505 and line 566. This holding circuit, as controlled by switch S505A (see Fig. 4), keeps relay 505 in operated condition through the remainder of the machine cycle during which the card is under the upper brush and on into the time interval between the time the record card leaves brush UB and the beginning of the second operational cycle. In this interval and before relay 505 is deactuated, relay 506 is actuated through a circuit completed from line 335 to line 334 via line 568, cam-operated switch S505B, line 569, contacts C505B, line 570, magnet M506 and line 571. As relay 506 is actuated to its closed position, a holding circuit for relay 506 is established from line 335 to line 334 via line 572, switch S506A, line 573, contacts C506A, line 574, magnet M506 and line 571. The function of this holding circuit is to hold relay 506 closed for the entire digit-indicating part of the card or machine cycle following any machine cycle in which any second numerical indication in the column being analyzed has been sensed at upper brush UB. When relay 506 is operated, normally closed contacts C506B will be opened. Accordingly, if there is any second numerical indication in a column, the normally completed circuit from socket 600 via lines 542 and 543, contacts C506B and line 544 to the units output will be broken during the digit-indicating portion of the machine cycle following the one during which the record card was under UB.

From the above, it can be seen that relays 503, 504, 505 and 506 and their associated components operate as a conditioning circuit responsive to sensing of a second digit-indicating perforation in a record card column to open contacts C506B and thus modify or reconnect the action circuit to break the common connection which otherwise would exist between socket 600 and the tens and units outputs 532 and 531. It will be noted that the occurrence of only one digit-indicating impulse at 601 during a first machine cycle will not open contacts C506B because neither M505 nor M506 can be energized without a second impulse. Also, a second nondigit-indicating impulse will not actuate contacts C506B to an opened position because contacts C504B reopen after "0" time and a circuit to M506 could not be completed during "E" time of the first machine cycle.

The action circuit connected to the second sensing means, lower brush LB, via socket 600, will now be considered during a second machine cycle following passage of the Fig. 2 record card (specifically, column 3) under brush UB. The alignment of the "5" perforation under LB completes an electrical circuit from socket 600 (via line 545, contacts C508B, line 546, line 547, contacts C510B and line 606) to the tens output socket 532, thus effectively transmitting an impulse at "5" time to adding magnet 77B via socket 532, jumper or patch cord 552 and socket 302B. The alignment of the "5" perforation under LB also completes an electrical circuit (via socket 600, wire 542 and rectifier 621) to relay coil M507, and on by line 575 to line 334. Energization of this coil actuates contacts C507A and C507B to a closed position. The former contacts, together with switch S507A, wire 576 and wire 578, constitute a holding circuit for M507, which maintains relay 507 actuated during the balance of the digit-indicating portion (prior to "0" time) of the machine cycle during which the Fig. 2 record card is at the lower brushes LB. The closure of contacts C507B energizes coil M508 (via wire 579, switch S507B, wires 580, 581 and 582). The resulting actuation of relay 508 operates to open contacts C508B thus breaking the circuit (via wire 546) between the lower brush LB and the tens output immediately after reception of a first digit-indicating impulse at brush LB. Contacts C508A, switch S508A and wires 582—585 constitute a holding circuit for relay 508 which maintains relay 508 actuated for the balance of the digit-indicating portion of the second machine cycle.

The alignment of the second perforation ("0") in column 3 of the Fig. 2 record card under LB cannot result in transmittal, in effect, of this second digit-indicating impulse to tens output socket 532, because of the opening of contacts C508B. However, the repositioning of these contacts C508B by actuation of relay 508 completes a circuit from socket 600 to the units output socket 531 (via wires 545, 585, 588, contacts C510C and wire 591). Thus, it can be seen that the Fig. 3 translating device under the second general set of conditions (two unlike digits encoded as two perforations in a single record card column, the tens digit being greater) functions to transmit, in effect, an impulse representing the numerically greater of two digits to only the tens output and an impulse representing the lesser digit to only the units output. The primary operational difference in the Fig. 3 apparatus during the first (two like digits) condition and this second condition is that the conditioning circuit connected to the upper brush breaks the circuit between socket 600 and the units output 531 by the opening of contacts C506B during the second machine cycle, if there is a second unlike digit encoded in the record card column.

The third and last possible general condition is represented by column 2 of the Fig. 2 record card. There the two-digit number "05" is encoded as two digit-indicating perforations (at "0" and "5") and a single nondigit-indicating position at "E." Operation of the Fig. 3 apparatus as described above in regard to the second condition is generally the same as described above in regard to the second general condition, with the exceptions and additions noted below. During the first machine cycle, sensing of the second digit indication at "0" again opens contacts C506B for the duration of the digit-indicating portion of the second machine cycle. However, an additional portion of the conditioning circuit, comprising relays 509 and 510 and their associated elements, comes into play. When the "E" perforation is aligned over UB during the first cycle a circuit energizing relay coil M509 (including wires 592, switch S509E and wires 593 and 594) is completed. Because of the timing sequence of S509E, M509 can be energized only by an "E" indication, and not by a digit-indicating impulse. Actuation of relay 509 closes contacts C509B and C509A, the latter being included in a holding circuit with wires 612, 595 and switch S509A. This holding circuit maintains M509 energized until after the first machine cycle is completed. With the closure of upper contacts C509B a circuit is completed through contacts S509B and wires 596—598 to energize M510 prior to the opening of switch S509A. Relay 510 is thereby energized when the record card appears under lower brush LB during the second machine cycle and remains energized until the digit-indicating portion of the second machine cycle is completed. Contacts C510B and C510C are each actuated thereby to reconnect wires 585 and 546 to the tens and units output circuits, respectively, rather than to the units and tens output circuits as was the case during the first and second general conditions of operation. Thus, the first, higher or earlier occurring impulse (e. g., "5") during the second machine cycle is transmitted as before only to wire 546 and the second impulse (e. g., "0") only to wire 585. However, actuation of relay 510 neatly reverses the connections between these wires and the tens and units outputs so that the tens magnet 77B is actuated by "0" and the units magnet 77A is actuated by "5."

In the ways detailed above, information in the bidecimal code, and sensed from a single column at the lower brushes will give rise to impulses in two different circuits, designated as the units circuit and the tens circuit, which thus carry in the Hollerith differential timing code two decimal digits of information.

It will be noted that an impulse at E-time in the cycle at which the record is at the lower brushes will be available at the tens output. In many machine operations this is inconsequential. It can, however, be readily eliminated by introducing an appropriate cam-operated switch into the circuit. The method of timing this contact and an appropriate position for its introduction will be readily apparent to those skilled in the art.

While the translating apparatus of the present invention has been particularly disclosed in connection with the control of magnets controlling the accumulation of numerical information in a tabulator, it is apparent that it can be used for controlling of printing devices, or of sorting mechanisms, or of comparing means, or of other features of record-controlled machines normally controlled by differentially timed impulses.

In the specific instance of sorting mechanisms, the typical sorting machine is responsive to the numerical information encoded in a single column. When information in a bidecimal code is to be sorted, it will be readily apparent that the records can be sorted either according to the units digit or according to the tens digit encoded within a single column. Accordingly, a sorting machine adapted to sorting records encoded in a bidecimal code, such as the code exemplified in the present enclosure, would normally have two reading stations, an embodiment of the present invention, and a switching device by which the sorting mechanism would be responsive either to the coded information available at the units output or at the tens output.

In comparing information encoded into a bidecimal code, such as the one used illustratively for the purposes of this disclosure, two reading stations would be used for both feeding means in those devices known in the trade as collators, of which the device disclosed in U. S. Patent 2,359,670 may be regarded as typical. Provided the cards from each feeding mechanism are read at two sets of brushes and decoded by the means disclosed in this application, no other changes are required.

Bidecimal information may also be compared and an unequal condition manifested by means such as those disclosed in U. S. Patent 1,933,349. While the invention described in this latter patent was developed in connection with combination codes, it is directly applicable to the comparing of bidecimal coding without the necessity of decoding it.

In certain record-controlled machines the record is held at a reading station for a number of machine cycles. It will be readily apparent to those skilled in the art that in such cases numerical information coded in a bidecimal code can be readily translated into the Hollerith differentially timed code, provided that successive machine cycles are used for conditioning cycles and action cycles. In such cases, a first cycle is used to activate the circuit depicted in the present disclosure as coming from the upper brushes and a second cycle is used to activate the circuit disclosed as coming from the lower brushes. Means for accomplishing these objectives will be readily apparent to those skilled in the art.

It is clear that any number of decoding units, one for each column to be decoded, and each unit leading information into two independent circuits can be installed in any record-controlled device, up to the number of maximum utility. This number will vary with the particular type of machine.

Referring again to Fig. 3, it will be noted that if sockets 531 and 532 are made common (and if there is no device eliminating any E-impulse from the tens circuit or, if there is, such a device is made inoperative) then the device is reconverted for use with any type of coding for which the machine is originally adapted. Sockets of the type 531 and 532 correspond more or less to "lower brush outlets" in conventional tabulating machines. If these are made common for any column, then the complete information encoded in the column, which may be alphabetic information, is made available. It is also apparent that if sockets of the order of 300 are connected by suitable patch cords to sockets of the order of 302, thus by-passing the invention, a device which incorporates means of decoding bidecimal information can be readily reconverted to the handling of information in other codes for which it may be adapted. In some cases this will also involve the use of circuits from sockets of the order of 301.

It is well-known that accumulators of the type disclosed in U. S. Patent 1,976,617 can be connected with a so-called "summary punch" which is one means of recording information standing in such accumulators after any reading cycle. Accordingly, it is necessary merely to combine the present invention with methods which are well-known for taking totals on tabulating machines after any reading cycle and for perforating a record card recording information standing in such accumulators, to present a system for converting bidecimal information automatically into Hollerith coding.

Methods are well known in the art of translating from Hollerith coding to binary coding and to various combination codes. Accordingly, the present invention needs only to be combined with such methods in order to present a system for translating bidecimal coding into binary coding or into various combination codes.

Attention is again directed to my copending application, Serial No. 451,329, issued as Patent No. 2,726,811, dated December 13, 1955.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Apparatus for translating two decimal digits, represented as to numerical value by one or two differentially timed impulses occurring among ten possible sequential digit-indicating instants of time during a single operational cycle of at least eleven possible sequential instants of time and identified as to relative denominational order by the presence or absence of an additional electrical impulse at a nondigit-indicating instant of time during said single operational cycle, into two separate differentially timed impulses, one in each of first and second separate electrical output circuits of assigned denominational order; said apparatus comprising a first electrical input connected to a conditioning circuit and adapted to receive impulses during a first machine cycle, and a second electrical input connected to a third electrical circuit and adapted to receive impulses during a following machine cycle, said third circuit adapted to connect said second input commonly to said first and second output circuits to transmit a single digit-indicating impulse simultaneously thereto, said third circuit including means responsive to reception of a second impulse by said conditioning circuit to modify the connections between said second input with said first and second output circuits whereby the first of two differentially timed digit-indicating impulses is transmitted from said second input to only one of said output circuits and the second of such impulses is transmitted to only the other of said output circuits.

2. Apparatus as set forth in claim 1 in which said output circuits are connected to control a pair of devices in a record-controlled machine.

3. Apparatus as set forth in claim 1 in which one of said output circuits is connected to energize the sorting mechanism of a card-sorting machine.

4. Apparatus as set forth in claim 1 in which at least one of said output circuits is connected to energize a counting mechanism in a record-controlled machine.

5. Apparatus as set forth in claim 1 in which said output circuits are connected to control a pair of printing units of a printing machine.

6. Apparatus as set forth in claim 1 in which said output circuits are connected to control a pair of accumulating units in a record-controlled machine.

7. Apparatus as set forth in claim 1 in which said output circuits are connected to control a pair of comparing units in a record-controlled machine.

8. Apparatus for translating two decimal digits, represented as to numerical value by one or two differentially timed impulses occurring in ten possible sequential digit-indicating instants of time during a single operational cycle of at least eleven possible sequential instants of time and identified as to relative denominational order by the presence or absence of an additional electrical impulse at a nondigit-indicating instant of time during said single operational cycle, into two separate differentially timed impulses, one in each of first and second separate electrical output circuits of assigned denominational order; said apparatus comprising a first electrical input connected to a conditioning circuit and adapted to receive impulses during a first machine cycle, and a second electrical input connected to a third electrical circuit and adapted to receive impulses during a following machine cycle, said third circuit adapted to connect said second input commonly to said first and second output circuits to transmit a single digit-indicating impulse simultaneously thereto, said third circuit including means responsive to reception by said conditioning circuit of a second impulse to disconnect said second output circuit from said second input, said third circuit further including means responsive to reception by the second input of a first of two differentially timed impulses to disconnect said first output circuit from said second input and to effect reconnection of said second input to said second output circuit whereby the first of two differentially timed digit-indicating impulses is transmitted from said second input to only one of said output circuits and the second of such impulses is transmitted to only the other of said output circuits.

9. Apparatus as set forth in claim 8 in which the third circuit additionally includes means responsive to reception of a nondigit-indicating impulse by one of said inputs to effect reversal of the connections to said first and second output circuits.

10. Apparatus for translating two decimal digits, represented as to numerical value by one or two differentially timed impulses occurring among ten possible sequential digit-indicating instants of time during a single operational cycle of at least eleven possible sequential instants of time and identified as to denominational order by the presence or absence of an additional electrical impulse at a nondigit-indicating instant of time during said single operational cycle, into two separate differentially timed impulses, one in each of first and second separate electrical output circuits of assigned denominational order; said apparatus comprising a first electrical input connected to a conditioning circuit and adapted to receive impulses during a first machine cycle, and a second electrical input connected to a third electrical circuit and adapted to receive impulses during a following machine cycle, said third circuit adapted in a first condition to transmit a single digit-indicating impulse simultaneously to both said first and second output circuits, said third crcuit adapted in a second condition to transmit the first of two differentially timed digit-indicating impulses only to said first output circuit and the second of such impulses only to said second output circuit, said third circuit adapted in a third condition to transmit the first of two differentially timed digit-indicating impulses only to said second output circuit and the second of such impulses only to said first output circuit, said conditioning circuit responsive to reception of a second digit-indicating impulse during the first machine cycle to actuate said third circuit from its first to its second condition, said conditioning circuit responsive to reception of a nondigit-indicating impulse during the first machine cycle to actuate said third circuit to its third condition.

11. Apparatus for translating two decimal digits, represented as to numerical value by one or two differentially timed impulses occurring among ten possible sequential digit-indicating instants of time during a single operational cycle of at least eleven possible sequential instants of time and identified as to denominational order by the presence or absence of an additional electrical impulse at a nondigit-indicating instant of time during said single operational cycle, into two separate differentially timed impulses, one in each of first and second separate electrical output circuits of assigned denominational order; said apparatus comprising a first electrical input connected to a conditioning circuit and adapted to receive impulses during a first machine cycle, and a second electrical input connected to a third electrical circuit and adapted to receive impulses during a following machine cycle, said third circuit including first and second switches adapted in their first positions to interconnect said second input commonly to both said first and second output circuits to transmit a single digit-indicating impulse simultaneously thereto, said second switch adapted in its second position to disconnect said second input from said second output circuit and thus transmit the first of two differentially timed digit-indicating impulses only to said first output circuit, said first switch adapted in its second position to connect said second input to said second output circuit and thus transmit the second of two differentially timed digit-indicating impulses only to said second output circuit, said second switch responsive to reception of a second digit-indicating impulse by said first input to change from its first to its second position, said first switch responsive to reception of a first impulse by said second input to change from its first to its second position.

12. Apparatus as set forth in claim 11 which further includes a third switch adapted to effect the reversal of the connections to said first and second electrical output circuits in response to reception of a nondigit-indicating impulse by said first input during the first machine cycle whereby the first of two digit-indicating impulses is transmitted to said second output circuit and the second such impulse is transmitted to the first output circuit.

13. In a record-controlled machine having a first sensing means adapted during a first machine cycle to convert two decimal digits having an assigned denominational relationship and encoded on a record into one or more digit- and nondigit-indicating differentially timed electrical impulses, a second sensing means adapted during a following machine cycle to convert said two record-encoded decimal digits into one or more differentially timed electrical impulses, and first and second separate electrical output circuits of predetermined denominational order; said apparatus comprising first and second inputs respectively connected to said first and second sensing means, a conditioning circuit connected to said first input, and a third electrical circuit adapted to connect said second input commonly to said first and second output circuits to transmit a single digit-indicating impulse simultaneously thereto, said third circuit including means responsive to reception of a second impulse by said conditioning circuit to reconnect said second input with said first and second output circuits whereby the first of two differentially timed digit-indicating impulses is transmitted from said second input to only one of said output circuits and the second of such impulses is transmitted to only the other of said output circuits.

14. Apparatus as set forth in claim 13 in which the third circuit additionally includes means responsive to reception of a nondigit-indicating impulse by said first input to effect reversal of the connections to said first and second output circuits.

No references cited.